United States Patent [19]
Collar

[11] Patent Number: 5,598,288
[45] Date of Patent: Jan. 28, 1997

[54] RF FIBER OPTIC TRANSMISSION UTILIZING DITHER

[75] Inventor: Stuart J. Collar, Algonquin, Ill.

[73] Assignee: Northrop Grumman Corporation, Los Angeles, Calif.

[21] Appl. No.: 509,634

[22] Filed: Jul. 31, 1995

[51] Int. Cl.$^6$ .................................................. H04B 10/12
[52] U.S. Cl. .................... 359/173; 359/111; 359/161
[58] Field of Search ...................................... 359/111, 154, 359/161, 173, 180, 181, 188–189; 375/243; 341/131

[56] References Cited

FOREIGN PATENT DOCUMENTS

| 0580889 | 2/1994 | European Pat. Off. | ............... 359/161 |
|---|---|---|---|
| 0003431 | 1/1983 | Japan | ...................................... 359/161 |

*Primary Examiner*—Wellington Chin
*Assistant Examiner*—Kinfe-Michael Negash
*Attorney, Agent, or Firm*—Terry J. Anderson; Karl J. Hoch, Jr.

[57] ABSTRACT

A low cost RF link is implemented by summing a wideband amplitude noise dither signal with a band limited RF signal. The summed signal is then amplitude limited. The output of the limiter can be applied directly to the digital fiber optic transmitter. At the remote end of the link, the original signal can be recovered by removing the noise dither signal. This can easily be accomplished with a narrow band filter centered on the original signal. This system uses the same optical fiber transmitters and receivers as the traditional system, but eliminates the need for the ADCs, DACs and parallel/serial format conversion hardware. Adding amplitude dither to the signal mitigates the intermodulation distortion that would normally be associated with the non-linear operation of amplitude limiting. In this way, multiple narrow band signals can be transmitted down a single fiber using digital fiber optic transmitters and receivers without distortion due to intermodulation. The technique of the invention has application in commercial systems requiring low cost transmission of analog narrow band voice or data signals over a digital fiber optic link. The inherent EMI/RFI immunity of optical fiber would make this especially attractive for industrial applications.

1 Claim, 4 Drawing Sheets dither.

RF FIBER OPTIC TRANSMISSION UTILIZING DITHER

FIELD OF THE INVENTION

The present invention relates to fiber optic RF links, and more particularly to such a link utilizing noise source dither to decrease intermodulation distortion of multiple narrow band signals.

BACKGROUND OF THE INVENTION

Fiber optic data links are widely used for digital data transmission in local area networks (LANs), wide area networks (WANs) and others. Optical fiber forms the backbone of the information superhighway. Optical fiber provides a wide band transmission medium which is immune to RF interference (RFI) and electro-magnetic interference (EMI).

The use of a dither signal to improve the dynamic range of an analog-to-digital conversion process in electronic circuits is widely documented and understood. However, a need exists for a low cost technique for using optical fiber to transmit narrow band RF signals long distances without the use of analog-to-digital converters (ADC), digital-to-analog converters (DAC) and digital parallel-to-serial and serial-to-parallel optical fiber interfaces.

BRIEF DESCRIPTION OF THE PRESENT INVENTION

The low cost RF link is implemented by summing a wideband amplitude noise dither signal with a band limited RF signal. The summed signal is then amplitude limited. The output of the limiter can be applied directly to the digital fiber optic transmitter. At the remote end of the link, the original signal can be recovered by removing the noise dither signal. This can easily be accomplished with a narrow band filter centered on the original signal. This system uses the same optical fiber transmitters and receivers as the traditional system, but eliminates the need for the ADCs, DACs and parallel/serial format conversion hardware. Adding amplitude dither to the signal mitigates the intermodulation distortion that would normally be associated with the non-linear operation of amplitude limiting. In this way, multiple narrow band signals can be transmitted down a single fiber using digital fiber optic transmitters and receivers without distortion due to intermodulation.

The technique of the invention has application in commercial systems requiring low cost transmission of analog narrow band voice or data signals over a digital fiber optic link. The inherent EMI/RFI immunity of optic fiber would make this especially attractive for industrial applications.

BRIEF DESCRIPTION OF THE FIGURES

The above-mentioned objects and advantages of the present invention will be more clearly understood when considered in conjunction with the accompanying drawings, in which.

DETAILED DESCRIPTION OF THE INVENTION

Figure 1:
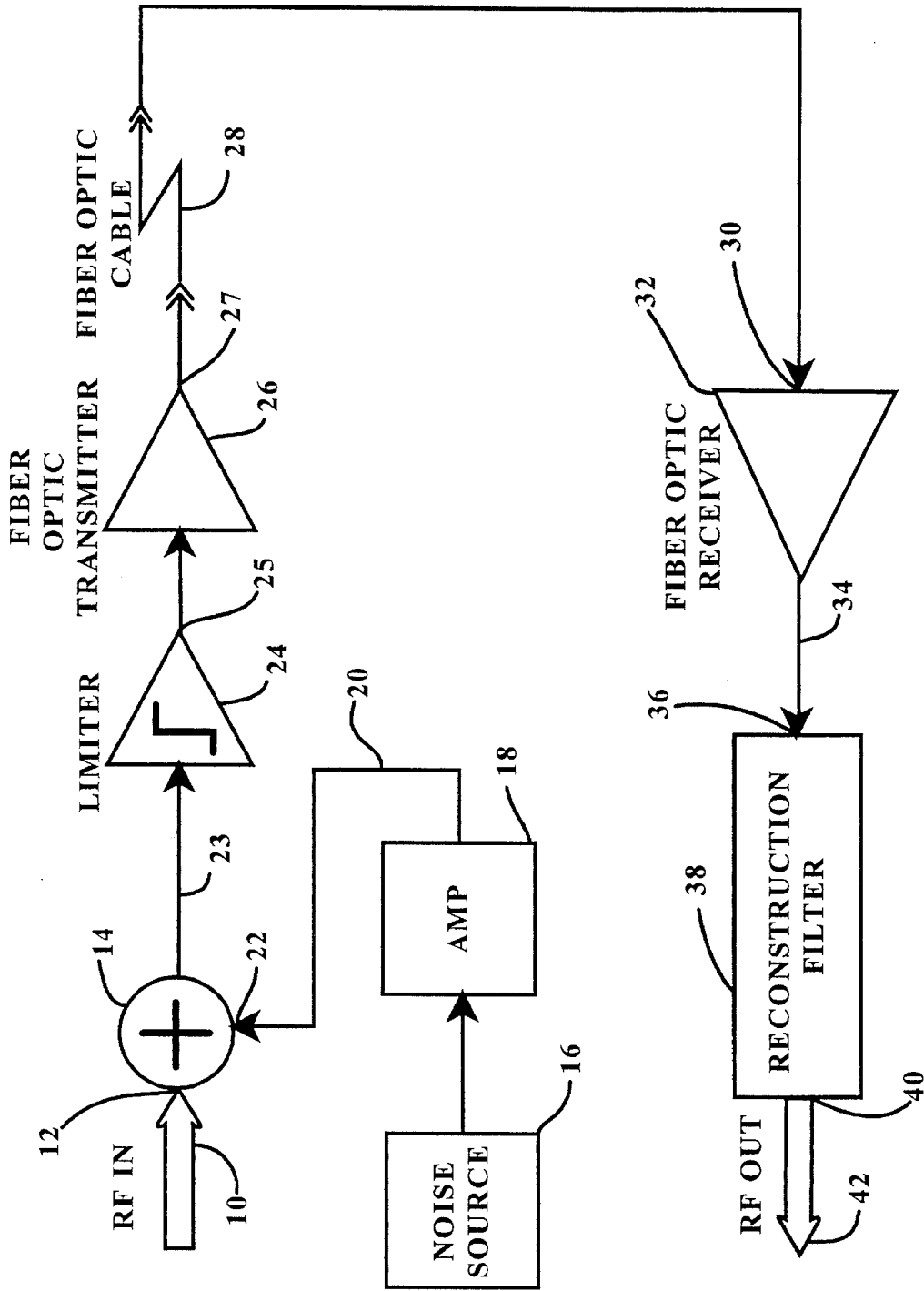
FIG. 1 is a block diagram of the present fiber optic transmission system.

Referring to FIG. 1, an RF input is presented at reference numeral 10, the input of a fiber optic RF link. In fact, at the input, there are multiple narrow band signals presented. The signals are presented as a first input 12 to an adder 14. A dithered signal is presented at input 22 of the adder. The dithered signal is initially generated at a noise source 16, which is an analog noise source. Such a source may be a noise diode, as, for example, the type of device manufactured by Noiscom, Inc. of Paramus, N.J. The dither signal from the noise source 16 is input to amplifier 18, the output 20 being connected to the input 22 of adder 14. In order for the present invention to operate most effectively, the dither signal from noise source 16 should be relatively wide band, as compared to the RF input signal at 10. In fact, the greater the bandwidth ratio of noise as compared to the RF signal, the lower the Signal-to-Noise ratio (SNR) of the recovered signal may be after the reconstruction filter at the system output. For example, the dither signal bandwidth may be set to 1 GHz in the event that 10 frequency multiplexed RF signals, each approximately 500 kHz were input to the system, each RF signal being separated by 10 MHz.

The output 23 of the adder 14 is then amplitude limited. This may be performed by a conventional limiter 24, the output 25 of which is input to a conventional fiber optic transmitter 26. The amplitude limiter performs an analog-to-digital conversion function, without using a separate converter, and operates by quantizing the signal to two levels. In fact, a digital fiber optic transmitter behaves as an amplitude limiter due to its digital nature. Therefore, a separate limiter, such as 24, may not be required in actual operation of the system. However, in a preferred embodiment of the present invention, the adder 22 and limiter 24 have their respective functions incorporated by a summing limiter-comparator, manufactured by Maxim, Inc. Another implementation is possible utilizing a combination limiter-RF limiting amplifier, such as that manufactured by Cougar, Inc.

The dithered signal is transmitted from output 27 of the fiber optic transmitter 26, to a fiber optic cable 28. At the receiver end 30 of the fiber optic cable, a conventional fiber optic receiver 32 receives the signal and converts it to an electrical signal. Both the fiber optic receiver 32 and transmitter 26 may be obtained from AT&T. At this point in the system, amplitude dithering to the RF signal has been accomplished and this mitigates the intermodulation distortion that would normally be associated with non-linear operation of amplitude limiting. Accordingly, multiple narrow band signals have been transmitted down a single fiber using digital fiber optic transmitters and receivers without distortion due to intermodulation. It is also important to note that this has been accomplished without the need for converters, such as ADCs, DACs and parallel/serial format conversion hardware. The original RF signal may be recovered by removing the noise dither signal. This is accomplished by utilization of a narrow band conventional reconstruction filter 38, such as manufactured by Mini-Circuits, Inc., centered on the original signal. At the output 40 of filter 38 is the reconstructed original RF signal 42 which is identical to that presented at the input 10 of the system.

A signal passed through an amplitude limiter is subject to distortion due to the non-linear limiting function. For a single tone passed through a limiter, this distortion will appear as odd harmonics in the limiter output spectrum. For example, the spectrum of an ideal square wave consists of the fundamental tone as well as all the odd (3rd, 5th, 7th, . . .) harmonics of the fundamental. If two or more tones are passed through the limiter, they are also subject to intermodulation distortion due to the non-linear response of the device.

Figure 2:
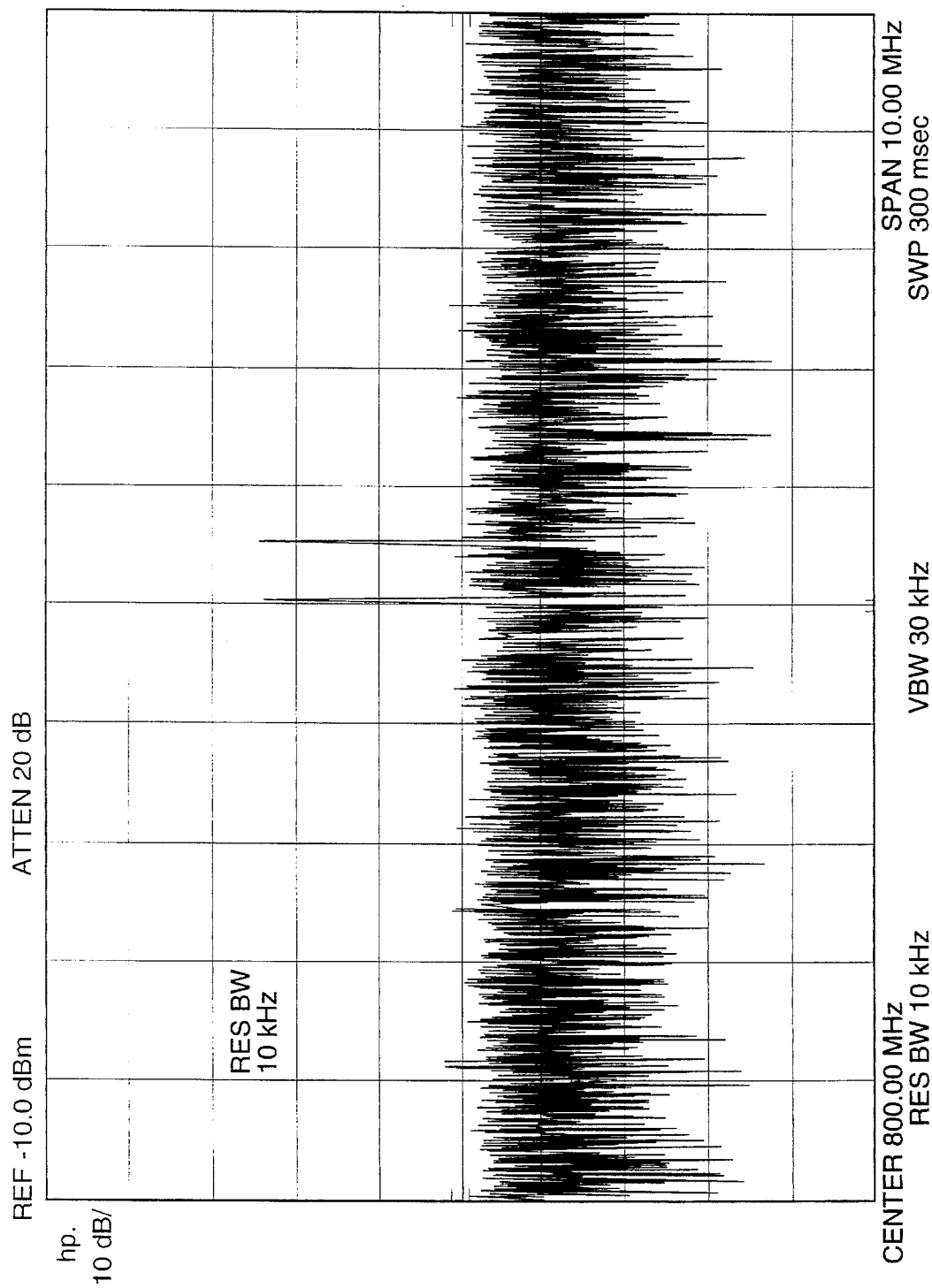
FIG. 2 is a plot of intermodulation distortion without dither.
Figure 3:
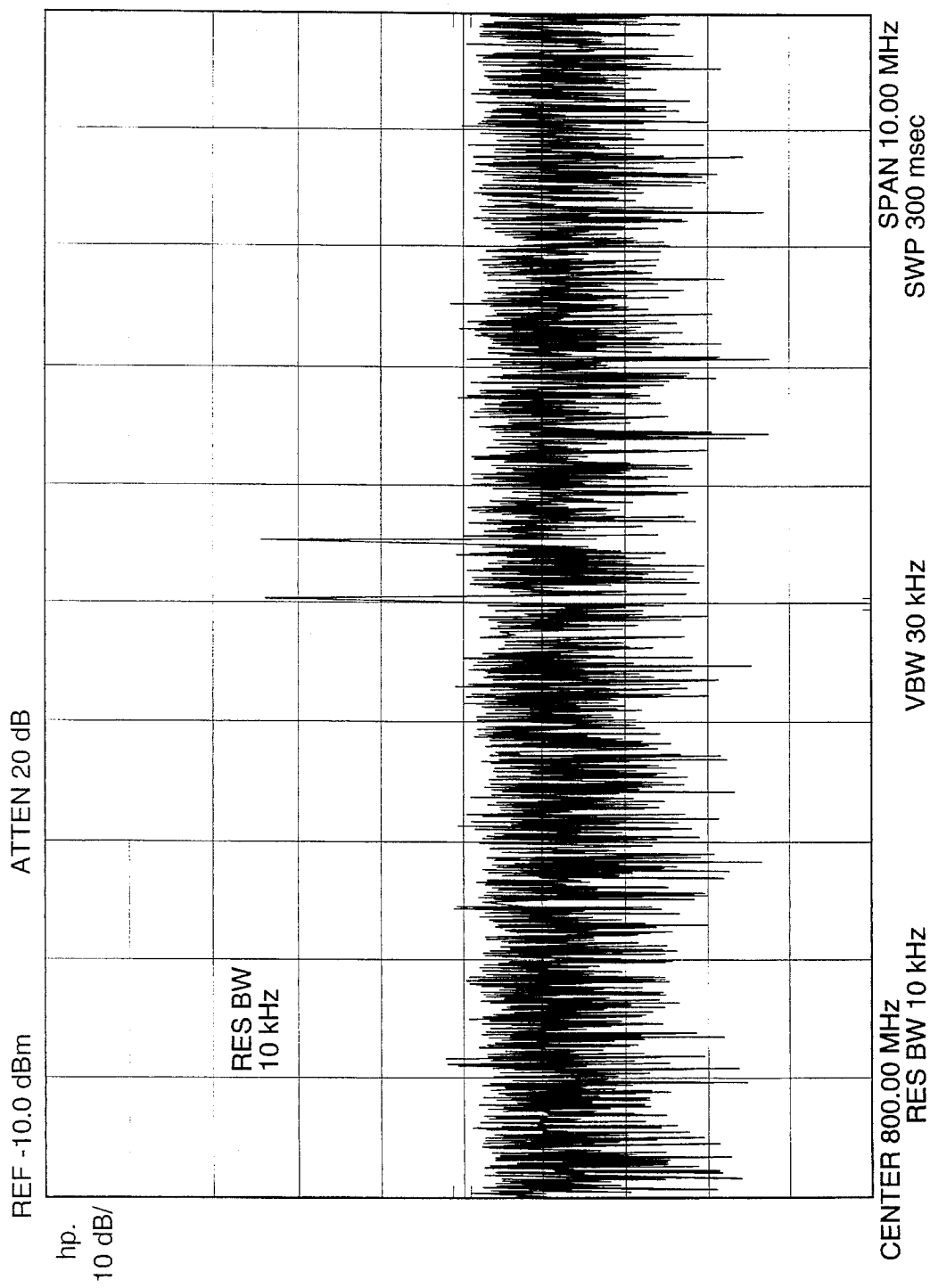
FIG. 3 is a plot of dither used to reduce intermodulation distortion.

FIG. 2 shows a spectrum analyzer plot of the intermodulation distortion between two equal power sinusoidal tones spaced 500 kHz apart and then hard limited and transmitted over 100 meters of fiber optic cable. This plot shows the actual output of the system described in FIG. 1 with noise source 16 disconnected. This distortion can be mitigated by the addition of the dither signal from the noise source, as shown in FIG. 1. When the dither is added to the signal with an approximate 0 dB signal to noise ratio, the signal output level from the limiter will behave in a linear fashion, relative to the output. Since the power out of the limiter is constant for a given input, the limiter output is still suitable for transmission over the digital fiber optic link. But the dither signal has mitigated the distortion of the limiter caused by quantizing the signal to two levels. FIG. 3 shows the same two tones transmitted over the 100 meter cable as previously seen in FIG. 2. In FIG. 3, the noise dither was turned on, and the intermodulation distortion was greatly reduced.

Figure 4:
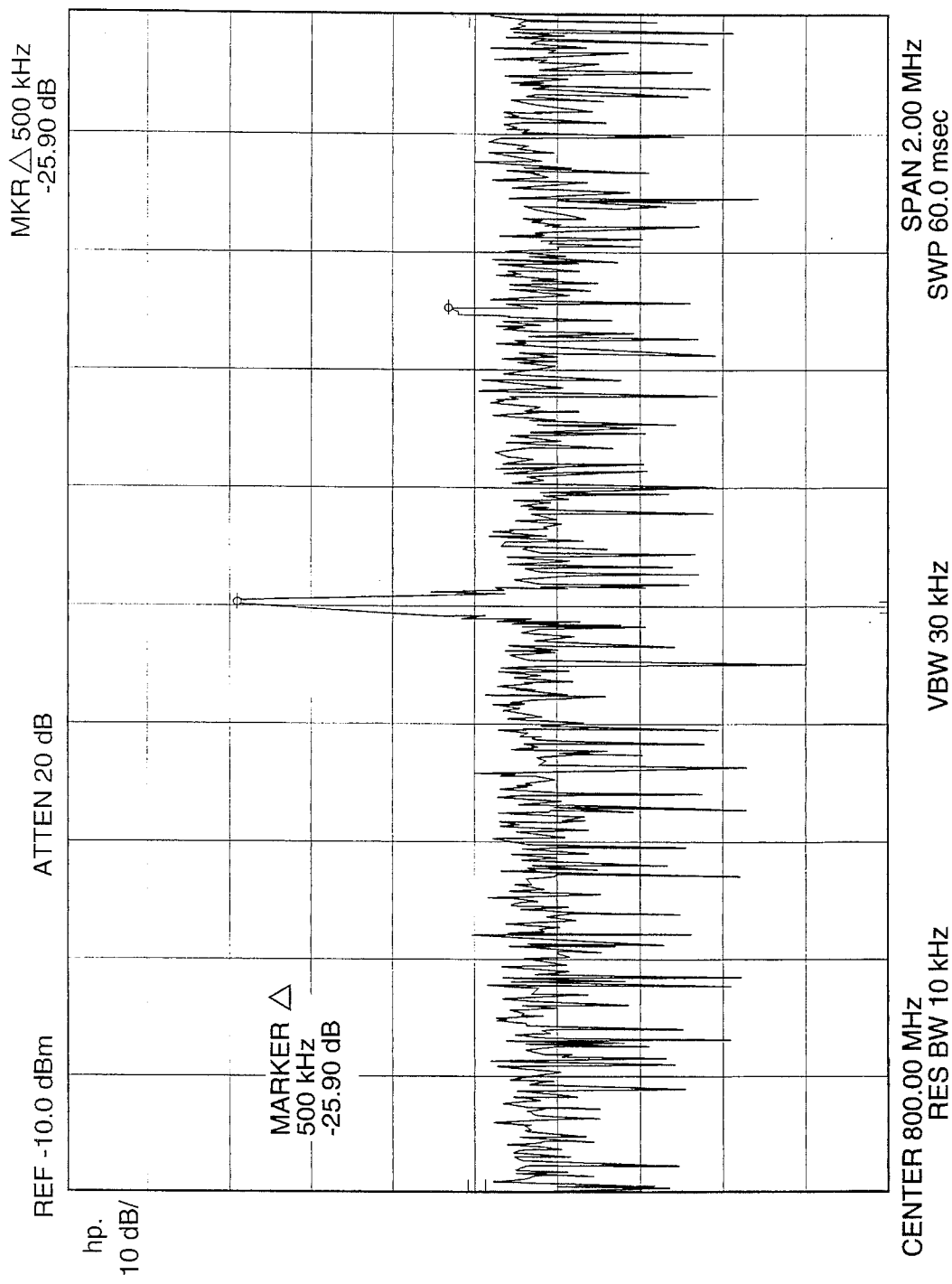
FIG. 4 is a plot of two tone dynamic range of the present dithered system.

This technique is viable for systems which require low cost transmission of band limited RF signals over digital fiber optic links. As previously mentioned, for this technique to work, the input signal must be band limited and the dither signal should be relatively wide band compared to the input signal. The signal to noise ratio of the reconstructed signal will depend upon the relative bandwidths of the reconstruction filter and the noise dither signal. The bandwidth of the reconstruction filter is desirably a narrow bandwidth, comparable to the channel bandwidth of an RF input signal. This will reject wide band noise at the output. In the example above the 3 dB noise bandwidth of the dither signal was approximately 1 GHz. In the actual obtaining of the plot shown in FIG. 4, a separate reconstruction filter was not employed. Thus, the effective bandwidth of a reconstruction filter was set by the resolution bandwidth of the spectrum analyzer used to make the measurements. The dynamic range of the system is illustrated in FIG. 4. The spectrum of two tones set 25 dB apart is shown. The spectrum of the less powerful tone is indicated 2½ boxes to the right of the more powerful tone —of substantially greater amplitude. The resolution bandwidth of the spectrum analyzer was 10 kHz in this test. Thus, obtaining the plot of FIG. 4 included the equivalent of a reconstruction filter, namely the load of the spectrum analyzer, simulating a 10 kHz notch filter on each side of the tones.

The dither technique described above can be used to transmit narrow band RF signals economically over long distances of fiber optic cable using commercially available digital fiber optic transmitters and receivers. A 1 Gbit per second fiber link would accommodate many appropriately spaced narrow band channels, and would offer EM and RF immunity to the transmitted signals. Signal to noise ratio is sacrificed compared to traditional transmission techniques, but a potentially lower cost system is obtained.

It should be understood that the invention is not limited to the exact details of construction shown and described herein for obvious modifications will occur to persons skilled in the art.

We claim:

1. A fiber optic RF link comprising:

means for introducing an RF signal, including multiple narrow band signal components, to a summing junction;

a noise source for generating a dither signal;

means connected to the output of the noise source for amplifying the dither signal prior to its introduction to the summing junction;

means located at the summing junction for adding the RF signal and the dither signal to create a dithered RF signal to be transmitted;

amplitude limiting means connected at its input to the output of the summing junction for linearly quantizing the dithered RF signal to two levels;

fiber optic transmitter means connected at its input to an output of the limiting means for converting the dithered RF signal from an electrical to optical form;

a fiber optic cable connected at its input to an output of the fiber optic transmitter for propagating the dithered RF signal;

fiber optic receiver means, connected at its input to the output of the cable, for reconverting the dithered RF signal from optical to electrical form; and a narrow bandpass filter means connected at its input to an output of the fiber optic receiver and having a narrow bandwidth centered at the frequency of the RF signal for removing the dither signal and recovering the original RF signal.

\* \* \* \* \*